United States Patent
Kulkarni et al.

(10) Patent No.: US 8,388,230 B2
(45) Date of Patent: Mar. 5, 2013

(54) SEAL GUARD

(75) Inventors: Anil S. Kulkarni, Bangalore (IN); Craig R. Etheridge, Canton, OH (US); Jennifer Smith, Swanzey, NH (US)

(73) Assignee: The Timken Company, Canton, OH (US)

(*) Notice: Subject to any disclaimer, the term of this patent is extended or adjusted under 35 U.S.C. 154(b) by 539 days.

(21) Appl. No.: 12/665,468

(22) PCT Filed: Jun. 27, 2008

(86) PCT No.: PCT/US2008/068529
§ 371 (c)(1),
(2), (4) Date: Dec. 18, 2009

(87) PCT Pub. No.: WO2009/006279
PCT Pub. Date: Jan. 8, 2009

(65) Prior Publication Data
US 2010/0183255 A1    Jul. 22, 2010

Related U.S. Application Data

(60) Provisional application No. 60/948,889, filed on Jul. 10, 2007, provisional application No. 60/947,071, filed on Jun. 29, 2007.

(51) Int. Cl.
F16C 33/76 (2006.01)
F16J 15/32 (2006.01)

(52) U.S. Cl. .................... 384/477; 384/482; 277/572

(58) Field of Classification Search ........... 384/477, 384/481, 482, 484, 486, 488; 277/551, 562, 277/572, 577
See application file for complete search history.

(56) References Cited

U.S. PATENT DOCUMENTS

| | | | | |
|---|---|---|---|---|
| 3,330,607 A | * | 7/1967 | Delp | 384/477 |
| 3,526,409 A | * | 9/1970 | Heinlein | 277/411 |
| 5,121,999 A | | 6/1992 | Johnson et al. | |
| 5,704,719 A | * | 1/1998 | Cook et al. | 384/484 |
| 5,711,617 A | | 1/1998 | Scheller | |
| 6,250,813 B1 | * | 6/2001 | Thibault | 384/495 |
| 6,817,769 B2 | * | 11/2004 | Johnson et al. | 384/478 |

FOREIGN PATENT DOCUMENTS

| | | |
|---|---|---|
| EP | 0168092 A2 | 1/1986 |
| GB | 1233669 | 5/1971 |
| WO | 0153713 A1 | 7/2001 |

OTHER PUBLICATIONS

International Preliminary Report on Patentability, from corresponding International Application No. PCT/US2008/068529, mailed Jan. 14, 2010.
PCT/US2008/068529 Search Report and Written Opinion dated Oct. 14, 2008.

* cited by examiner

*Primary Examiner* — James Pilkington
(74) *Attorney, Agent, or Firm* — Polster, Lieder, Woodruff & Lucchesi, L.C.

(57) ABSTRACT

A seal guard 12 for a wide inner ring bearing assembly 10 comprising an annular member 22 configured for attachment to an external surface 24 of a bearing outer ring 16, and which radially encloses the various seal components 18 disposed within an annular opening between the inner ring 14 and outer ring 16. The annular member 22 includes an angled external surface 22A adapted to deflect external contaminates away from direct impingement upon the seal components 18.

7 Claims, 4 Drawing Sheets

SEAL GUARD

CROSS-REFERENCE TO RELATED APPLICATIONS

The present application is the United States National Stage under 35 U.S.C. §371 of International Application Serial No. PCT/US2008/068529, having an International Filing Date of Jun 27, 2008 and is related to, and claims priority from, U.S. Provisional Application Serial No. 60/947,071, filed on Jun. 29, 2007 and from U.S. Provisional Application Serial No. 60/948,889, filed on Jul. 10, 2007, both of which are herein incorporated by reference.

STATEMENT REGARDING FEDERALLY SPONSORED RESEARCH

Not Applicable.

BACKGROUND OF THE INVENTION

The present invention is generally related to bearing seal structures designed to reduce damage to sealed wide inner ring bearings when the bearings are subjected to high-pressure wash down applications such as may occur in food-processing environments, and in particular, to a seal guard configured to prevent ingress of water and external contaminates into a sealed bearing to reduce loss of grease from the bearing and to reduce rust formation on the bearing seals or within the bearing.

In traditional wide inner ring bearing assemblies, such as those mounted on rotating shafts, the bearings are imperfectly sealed against contaminate ingress and lubricant loss by stamped metal end caps and conventional rubber seals. These rubber seals and end caps fit within the annular openings between the bearing rotating inner and outer ring components. In such configurations, it is possible for external contaminants, such as water, to enter the bearing assembly bore under the seals and end caps, damaging internal components and causing a purge of lubricating grease from the bearing assembly bore. For example, in food processing applications, machinery, and hence the bearings, may experience high pressure wash down with water jets during which water, and any suspended environmental contaminates, may enter a bearing through the seal bore area or the area where the metallic seal cap attaches to the outer ring seal groove. Traditional bearing caps made from metal stampings are often not water resistant, and an ingress of water into the bearing erodes the bearing's lubricating grease and, over the course of time, gradually causes these bearings to corrode and ultimately seize.

Accordingly, it would be advantageous to provide wide inner ring bearings, such as those utilized in food-processing environments, with an improved seal design configured to reduce water and contaminant ingress into the bearing assembly during exposure to harsh environments.

BRIEF SUMMARY OF THE INVENTION

Briefly stated, the present disclosure provides a seal guard for a wide inner ring bearing. The seal guard consists of a thick annular member configured for attachment to the axial end external surfaces of the bearing outer ring and seal components, and which encloses the annular gap between the rotating inner and outer rings, as well as the various sealing components disposed between the inner and outer rings. The annular member of the seal guard includes an external surface which is axially sloped towards the outer ring component and adapted to deflect water away from direct impingement on the seal components, such as may occur during high-pressure wash-down applications.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

DESCRIPTION OF THE PREFERRED EMBODIMENT

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 1:
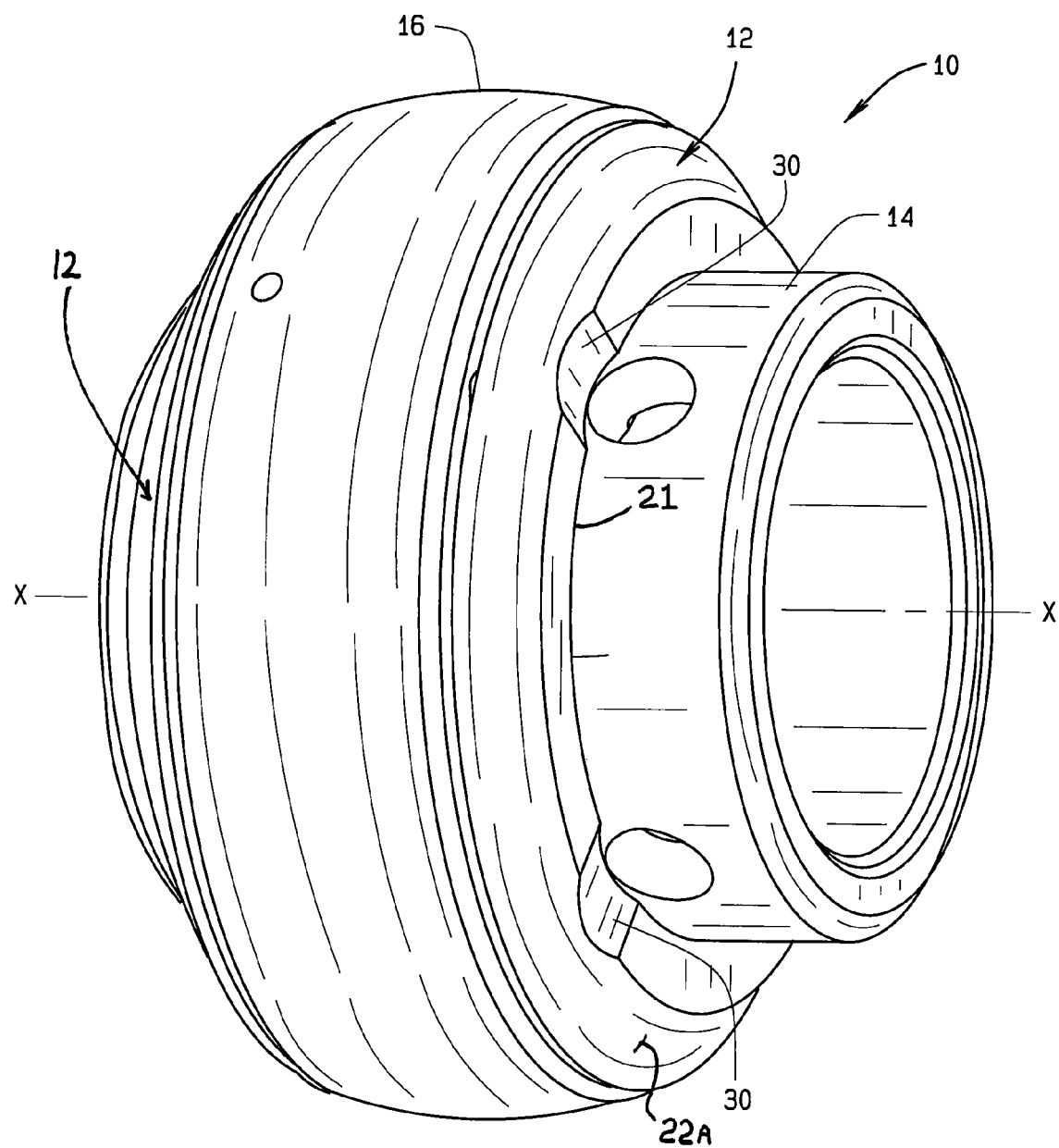
FIG. 1 is a perspective view of a set screw bearing assembly including a seal guard of the present disclosure.
Figure 2:
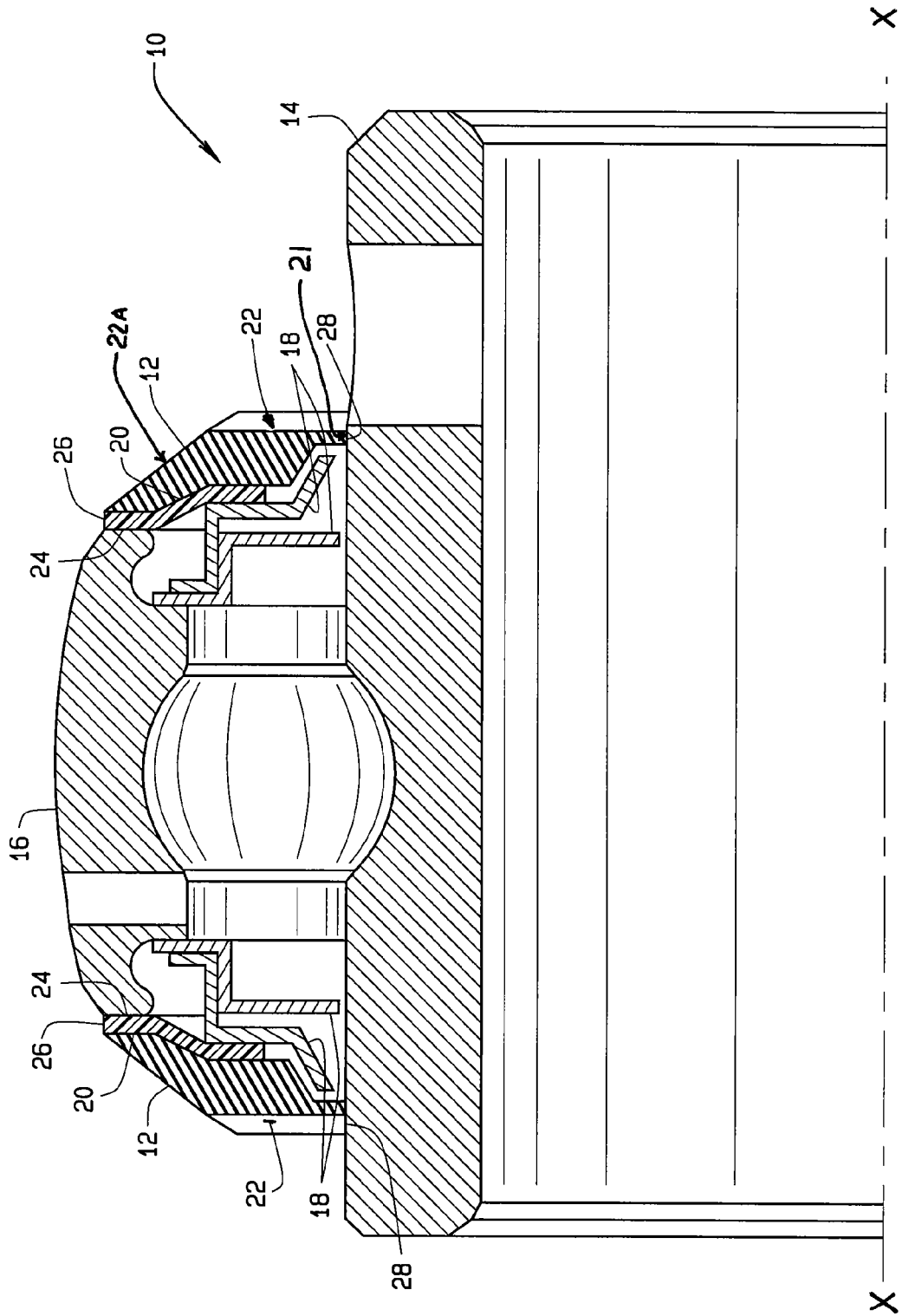
FIG. 2 is a quarter sectional view of the bearing assembly of FIG. 1.

Turning to the figures and to FIGS. 1 and 2 in particular, a wide inner ring bearing assembly 10 is shown with an annular seal guard 12 of the present disclosure disposed to enclose the annular opening between the rotating inner ring 14 and outer ring 16 for at least one of the axial ends of the bearing assembly 10. The annular seal guard 12 is fitted to the bearing assembly 10 externally over the standard seal components 18 which are disposed to seal an annular opening between the inner ring 14 and the outer ring 16.

Figure 3:
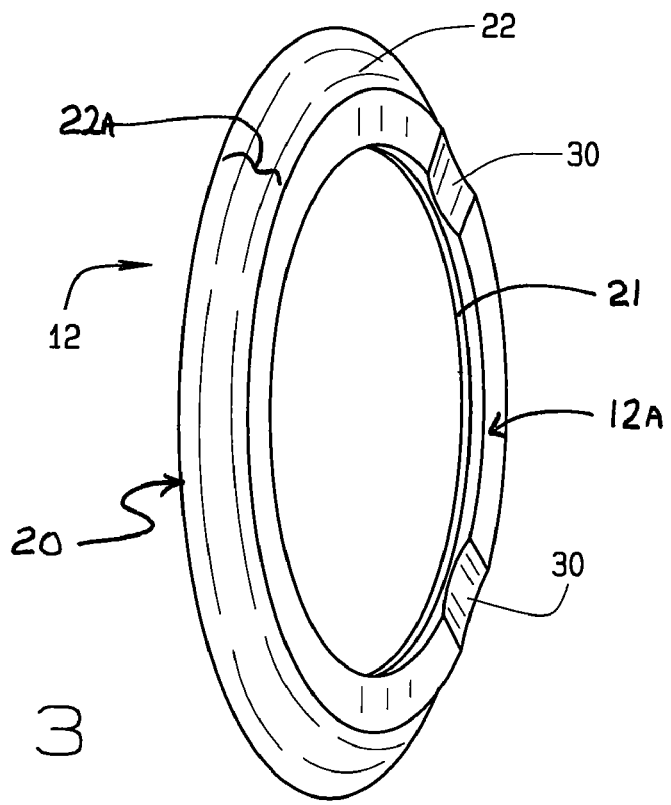
FIG. 3 is a perspective view of a seal guard of the present disclosure for use on a set screw bearing.
Figure 4:
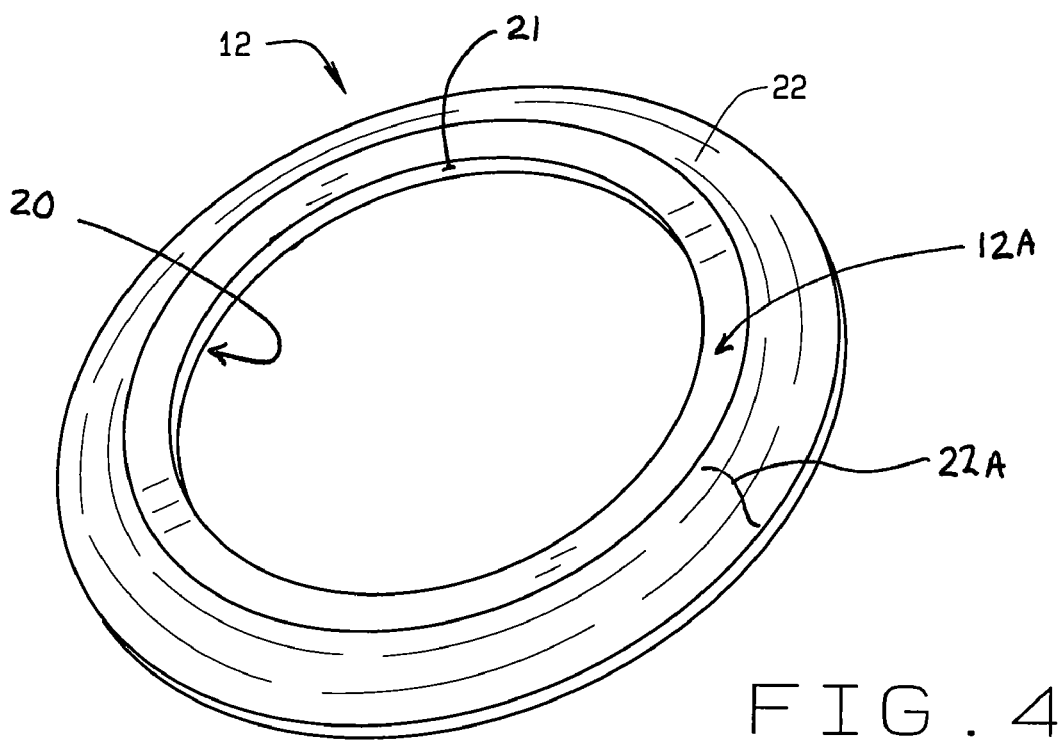
FIG. 4 is a perspective view of a seal guard of the present disclosure for use on a bearing with or without a locking collar.

As seen in FIGS. 3 and 4, the annular seal guard 12 consists generally of an annular ring 12A having an annular inner surface 20 disposed towards, and configured to seat against, the sealing components 18 present in the annular opening between the bearing inner and outer rings, and further has an annular outer surface 22. A radial width of the annular ring 12A is sized to fully enclose the annular opening between the inner ring 14 and outer ring 16 of the bearing assembly 10, abutting against standard seal components 18, and to overlap at least a portion of the axial end face 24 of the outer ring 16. To reduce the potential for separation of the seal guard 12 from the outer ring 16, the seal guard inner surface 20 is preferably configured to provide a maximum region of surface contact for adhesion with the axial end face of the outer ring 16 and any stationary seal components 18, reducing the potential for separation or loosening of the seal guar 12, such as during a high-pressure wash down of the bearing assembly 10 external surfaces.

The annular outer surface 22 of the seal guard 12 is configured with a surface 22A which is axially sloped towards the outer ring 16 to facilitate the deflection of impinging contaminates away from the annular opening between the rotating inner ring 14 and outer ring 16. As can be further seen in FIGS. 1 and 3, the outer annular surface 22 of the seal guard may include one or more recessed or filleted portions 30 configured to facilitate access to various connection points on the wide inner ring 14, such as for the placement and adjustment of set screws in an associated lock ring member as seen in FIG. 1.

The seal guard 12 may be secured to the axial end face 24 of the outer ring 16 and to the installed sealing components 18 by any suitable attachment means, which may include bonding adhesives or adhesive tapes such as shown at 26 in FIG. 2. In order to avoid creating enclosed voids between the seal guard 12 and the seal components 18, within which bacteria or other contaminates may become entrapped, it is preferable that any adhesive utilized to secure the seal guard 12 have sufficient volume to fill any potential enclosed voids, and that the axial inner surface of the seal guard 12 have a contour which closely matches the contour of the axial outer surface of the outer ring 16 and seal components 18.

Preferably, the seal guard 12 is composed of a unitary body of polymer plastic, but may optionally be composed of any material that resists absorbing water or other environmental contaminates, which resists changing size, and which resists the growth of bacteria or micro-organisms, depending upon the particular environment and operating conditions to within which the bearing assembly 10 is intended for use.

Figure 5:
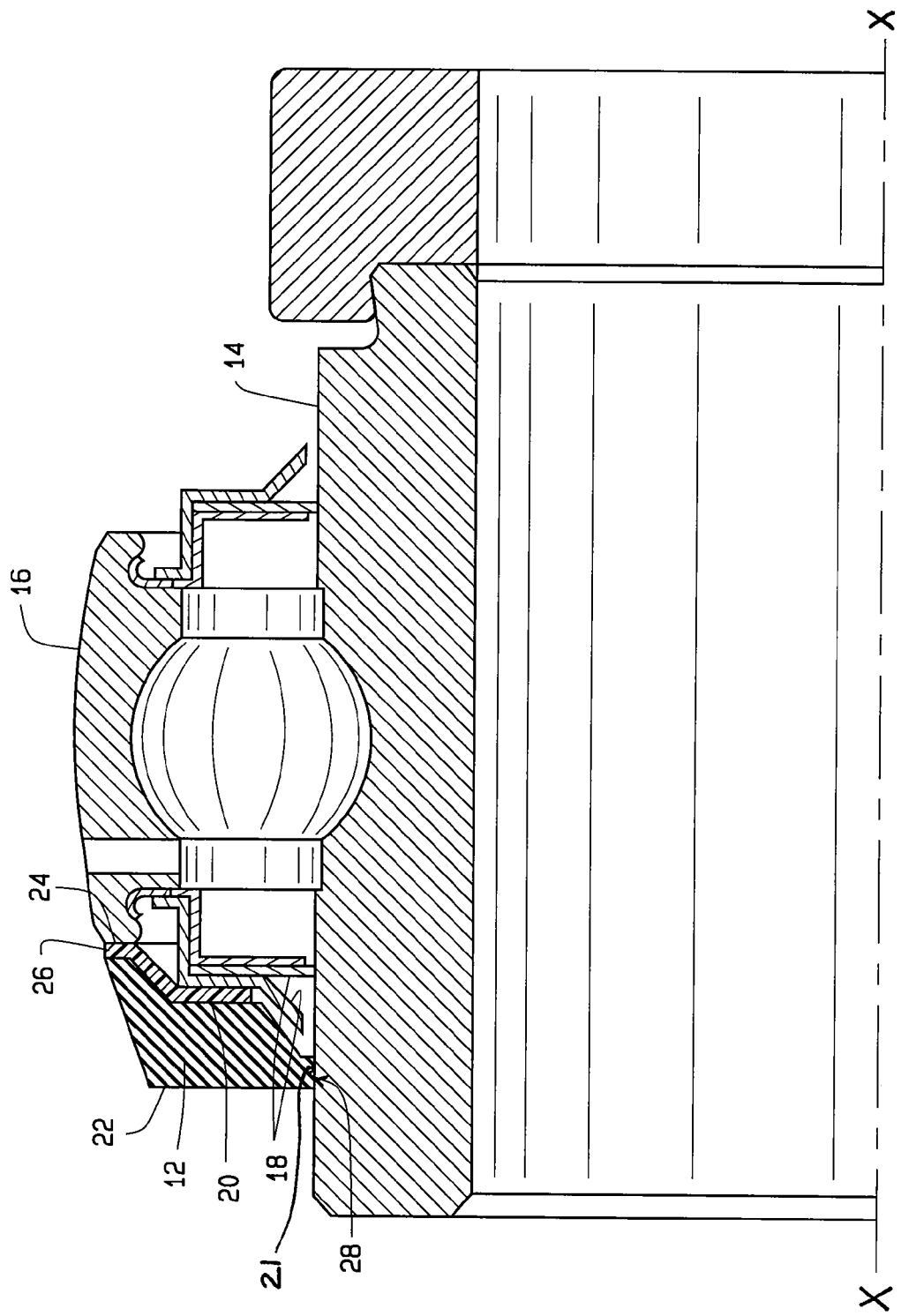
FIG. 5 is a quarter sectional view of an alternate configuration for a bearing assembly incorporating a seal guard of the present disclosure at one end.

As seen in FIGS. 2 and 5, the seal guard 12 has an axial thickness sufficient to define an inner diameter mating surface 21 adapted for abutting contact with the rotating outer diameter surface 28 of the inner race 14 at a location which is axially displaced from the seal components 18. The material of the seal guard 12 is further selected such that bore clearance between the inner diameter surface 21 or inner radius of the seal guard 12 and the rotating inner ring 14 is minimal, and so that the seal guard 12 will "break in" if interference occurs due to bearing misalignment or runout. The abutting contact between the inner diameter surface 21 and surface 28 of the inner ring 14 prevents a void from forming between the seal guard 12 and the inner ring 14 which would permit external contaminates, such as bacteria, to enter into the region of the and the seal surfaces 18 and become trapped therein.

During operation of the bearing assembly 10, wherein the inner ring 14 is rotating about the bearing axis X relative to the outer ring 16, the seal guard 12 remains stationary relative to the outer ring 16, thus preventing abrasive wear due to the rotation of the inner ring 14. External contaminates and high-pressure jets of liquid employed during wash-down of the bearing assembly 10 are prevented from entering the annular opening between the inner ring 14 and the outer ring 16 by the seal guard 12. To facilitate the prevention of contaminate and liquid intrusion into the bearing 10, the seal guard 12 has a sloped profile 22A on its outer surface 22, and is configured to maintain a close clearance between the seal guard inner diameter 21 and inner ring rotating surface 28. The sloped outer profile 22A helps to deflect liquid away from the bearing annular opening during high pressure wash down, while the conventional bearing seal components 18 act as a secondary barrier for any external contaminates which pass through the close clearance through seal guard inner diameter 21 and the rotating inner ring surface 28. The conventional bearing seal components 18 further prevent internal bearing lubricants, such as grease, from eroding out of the bearing 10.

As various changes could be made in the above constructions without departing from the scope of the disclosure, it is intended that all matter contained in the above description or shown in the accompanying drawings shall be interpreted as illustrative and not in a limiting sense. Those of ordinary skill in the art will further recognize that numerous applications for a seal guard of the present disclosure exist, and are not limited to food-processing applications as described above. For example, seal guards of the present disclosure may be utilized to prevent fiber-wrap damage or ingress to a bearing in turf-care and agricultural applications, or weld spatter damage in construction and assembly applications without departing from the scope of the disclosure.

The invention claimed is:

1. A bearing seal guard for use with a bearing assembly having a wide inner ring rotating relative to a narrower coaxial outer ring spaced annularly apart there from and supported by a plurality of rolling bearing elements, with annular openings between the inner ring and outer ring sealed at each axial end of the bearing assembly by seal components disposed there in, comprising:
   at least one contiguous annular seal guard disposed to enclose the annular opening and seal components at one end of the bearing assembly, the annular seal guard operatively coupled to an axial end surface of the bearing outer ring and seal components, and having a radial inner surface in contact with an outer surface of the rotating inner ring, said contiguous annular seal guard being secured by adhesive bonding to at least said axial end surface of said outer ring and the seal components.

2. The bearing seal guard of claim 1 wherein said contiguous annular seal guard is configured with an outer surface adapted for deflection of contaminate inflows.

3. The bearing seal guard of claim 2 wherein said annular seal guard outer surface is axially sloped radially outwardly towards said outer ring.

4. The bearing seal guard of claim 1 wherein said contiguous annular seal guard is composed of a polymer material.

5. The bearing seal guard of claim 1 wherein said adhesive bonding substantially fills entrapped voids disposed between an axially inner surface of the annular seal guard and the axial end surface of the outer ring and seal components.

6. The bearing seal guard of claim 1 wherein a region of contact between said outer surface of the rotating inner ring and said radial inner surface of said annular seal guard is axially displaced from said bearing seal components.

7. The bearing seal guard of claim 1 wherein an axial inner surface of said contiguous annular seal guard is adapted to conform to an axial outer surface profile of the bearing seal components disposed within the annular opening.

* * * * *